United States Patent [19]
Mintz et al.

[11] Patent Number: 4,986,055
[45] Date of Patent: Jan. 22, 1991

[54] CUSHION COMPRESSION MACHINE FOR COMPRESSING A CUSHION AND APPLYING A COVER TO THE CUSHION

[75] Inventors: David Mintz; Leonard Olshansky, both of West Bloomfield, Mich.

[73] Assignee: Machine Design Systems, Inc., Detroit, Mich.

[21] Appl. No.: 481,456

[22] Filed: Feb. 16, 1990

[51] Int. Cl.$^5$ .................... B65B 1/24; B65B 63/02; B68G 7/00
[52] U.S. Cl. .................... 53/526; 53/529; 29/91.1
[58] Field of Search .............. 29/91.1, 91.5; 53/243, 53/255, 261, 390, 392, 523, 524, 526, 529; 100/218, 232

[56] References Cited

U.S. PATENT DOCUMENTS

| | | | |
|---|---|---|---|
| 3,325,329 | 6/1967 | Bolesky | 29/91.1 X |
| 4,385,427 | 5/1983 | Fraiser | 29/91.5 |
| 4,675,962 | 6/1987 | Tillner et al. | 29/91.1 |
| 4,732,097 | 3/1988 | Guilhem | 29/91.5 X |
| 4,845,925 | 7/1989 | Thompson | 53/524 X |

Primary Examiner—Robert L. Spruill
Assistant Examiner—Beth Bianca
Attorney, Agent, or Firm—Gifford, Groh, Sprinkle, Patmore and Anderson

[57] ABSTRACT

An apparatus and method for applying covers to seat cushions, including a frame cushion support which is rotatable between a portion in which the cushion covered thereby is compressed to facilitate placing the cover over the cushion and a position which provides access to the bottom of the cushion to facilitate fastening the cover to the cushion.

13 Claims, 3 Drawing Sheets

CUSHION COMPRESSION MACHINE FOR COMPRESSING A CUSHION AND APPLYING A COVER TO THE CUSHION

BACKGROUND OF THE INVENTION

I. Field of the Invention

The instant invention relates to a method and apparatus for applying covers to seat cushions to form finished seats such as are often provided in motor vehicles.

The invention particularly pertains to the manufacture of seats with stressed covers which conform tightly to inner cushion material (such as material commonly employed in vehicle seats) which material is usually resilient and deformable. The resulting seats embody covers which follow the contours of the cushions without slackness.

II. Prior Art

Seats of the type to which the instant invention pertains comprise resilient compressible foam cushions, and covers which may be of synthetic materials and which are normally shaped to generally conform to the shape of the finished seat. Normally these covers are of a smaller size than the cushion material to be enclosed by the cover. Accordingly the foam core must be compressed in order to place the cover over the cushion.

Seats of this type often also comprise an innerspring structure with a peripheral frame which forms a means for supporting a cushion and provides the major support for the seat. As is known, the cover in such seats must be forced over the cushion's upper face, then down the sides of the cushion, then pulled inwardly beneath the spring frame, and finally secured to the frame by hog-tying or like means. It is known to provide a work place support for the seat which holds the frame and cushion in an upright position in which the cover can be forced over the top and down the sides of the cushion. Once this is accomplished it is also known to rotate the cushion 180°, fix it in position once again and, while the frame is still held by the support, pull the cover ends over the innerspring frame, and lastly hog-tie the cover in position.

According to the known methods and apparatus, workers must physically pull and tug the cover over the top of the cushion, and after the inversion of the cushion, they must pull the cover upwardly and over the lower half of the cushion, then the cover must be pulled over the spring frame before the cover can be hog-tied to the frame.

SUMMARY OF THE INVENTION

Among the purposes of the instant invention are to provide for relieving the amount of stress and strain required of workmen in placing covers over the seat cushions, and to speed the process of completing the manufacture of the covered seat.

In accomplishing these purposes there is provided a seat frame cushion support having latches which engage the seat frame and which fix the frame and the cushion with its compressible foam core facing upwardly. Once the cushion is maintained in that position, a cushion compression means compresses and reduces the overall size of the cushion. Whereupon, the cushion cover, which is normally smaller than the cushion can be readily placed over the foam cushion while it is still compressed. This makes it possible to relatively easily, as compared to the prior art, pull the cover over the cushion. Next the cushion compressing means is withdrawn from the cushion and the cushion with the cover in place is allowed to expand.

Thereafter, the cushion and seat frame are rotated approximately 180° until the spring frame of the seat is now facing upwardly and the cushion is facing downwardly compared to its prior position. In this condition the cover extends over the sides of the cushion with the lower edges of the cover now facing upwardly and lying above or along side of the cushion. Next the cushion is again compressed. This time from below, forcing the cushion upwardly, and also moving the cover upwardly with it. As a result, the cover open end now can easily be urged over the lower, now momentarily upper, edges of the cushion and the frame, and brought inwardly of the frame and then attached to the spring. Once this is accomplished, the lower compressing means is withdrawn and the cushion is allowed to expand and completely fill the cover. The cushion supporting frame latches can now be withdrawn from engagement with the seat frames and the cushion removed.

The invention provides an apparatus for facilitating the positioning of the covers over the larger cushions, and for thereafter faciliting the attachment of the cover to the seat frame so as to produce a taut cover closely following the contours of the resilient cushion. The invention further provides a means and method whereby the cushion is compressed by applying a force to the cushion, then the cover is placed over the cushion while it is still in the compressed state, and thereafter the compressive force is removed with the cover in place upon the cushion and the cushion permitted to expand within the cover. The invention further comprises applying a second compression force directly to the covered cushion which facilitates stretching the seat cover over the cushion and the seat frame and thereafter attachment of the cover to the seat frame.

DETAILED DESCRIPTION OF A PREFERRED EMBODIMENT OF THE PRESENT INVENTION

Figure 4:
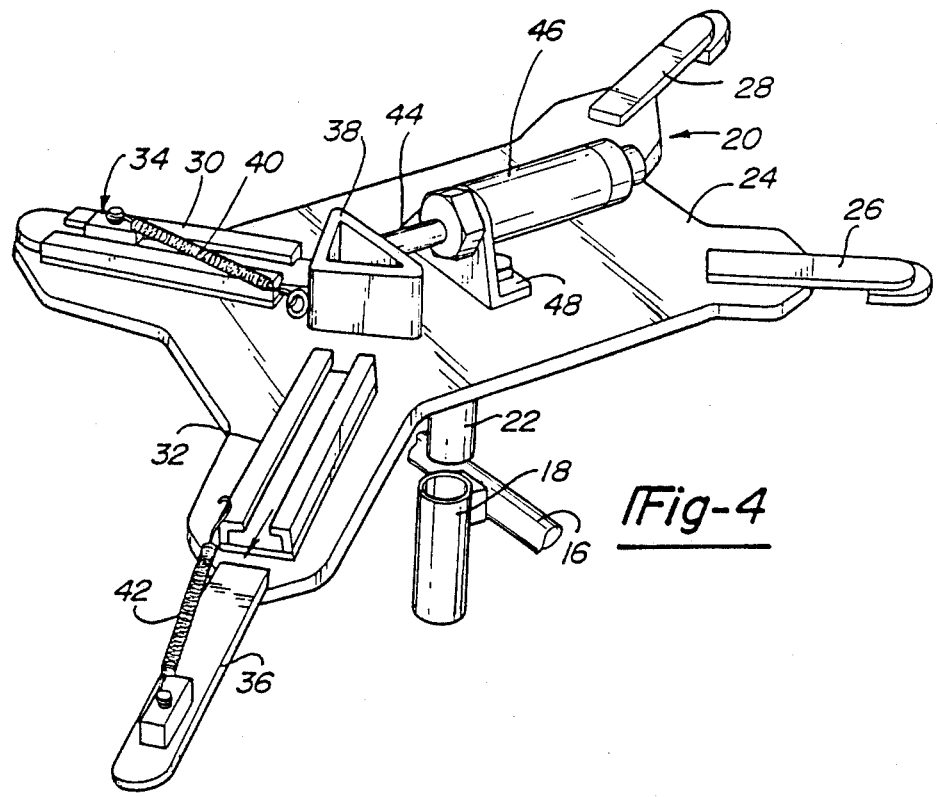
FIG. 4 is a perspective view of a seat frame fixture and latch.

Referring now to the drawings, a preferred form of apparatus comprises a support 10 formed of vertical and horizontally disposed frame members such as 12 and 14 in which there is rotatably supported a horizontailly disposed shaft 16. Centrally of the shaft 16 there is attached a sleeve 18. Sleeve 18 may be attached to shaft 16 by welding. A seat frame support 20, FIG. 4, has a centrally positioned post 22 rotatably supported in the sleeve 18, and an upper normally horizontally disposed plate 24. Retaining rings (not shown) are used to retain the support 20 within the sleeve 18 and the support 20 can rotate within the sleeve 18. Support 20 is generally in the form of a rectangular plate. Adjacent each of the right hand corners, as viewed in FIG. 4, there is provided a pad 26 and 28 respectively projecting outwardly therefrom. Adjacent the left hand corners of the plate and on corner extensions thereof there are provided channels 30 and 32 formed by angle brackets secured to plate 24 as by welding. Latch members 34 and 36 are slidably received within the channels 30 and 32. Latch members are held against a triangularly shaped actuator plate 38 by tension springs 40 and 42 attached respectively to actuator 38 and latch members 34 and 36. Plate 38 is attached to piston rod 44 of piston 46. Piston 46 is secured to plate 24 by mounting 48. Upon actuation of the piston 46, the latch members 34 and 36 are urged outwardly of plate 24 as the rod 44 is extended.

Figure 6:
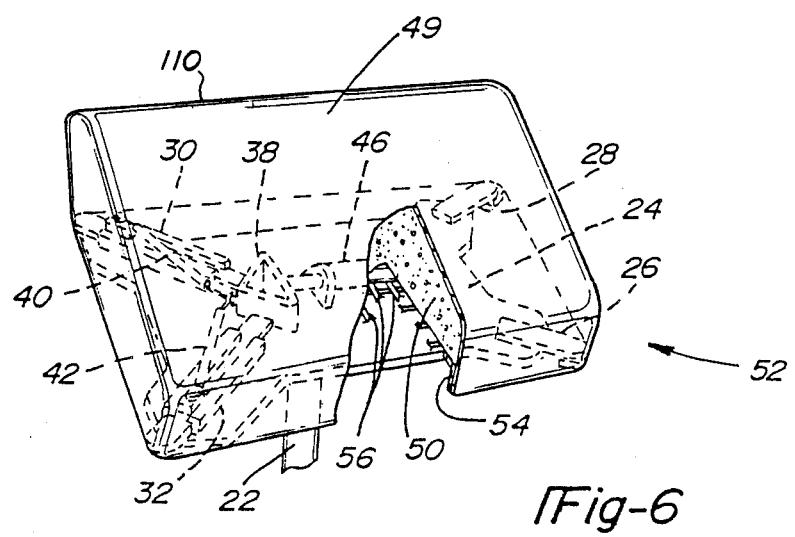
FIG. 6, is a perspective view of a foam cushion and spring frame assembly.

FIG. 6 illustrates a typical seat cushion 49 comprising the foam of cushion 50 and the metallic frame 52. Frame 52 comprises a rigid perimeter 54 and resilient spring members 56. The seat frame support 20 is formed so as to have its perimeter 54 engaged by pads 26 and 28 and latch members 34 and 36 to temporarily lock the cushion 49 to the seat frame support 20. This is accomplished by first attaching the perimeter frame to pads 26 and 28 and then pressing the frame 52 and cushion 50 down over the ends of latch members 34 and 36 and then actuating the piston 46 to move the latches 34 and 36 outwardly over the inner surfaces of frame 52.

Figure 1:
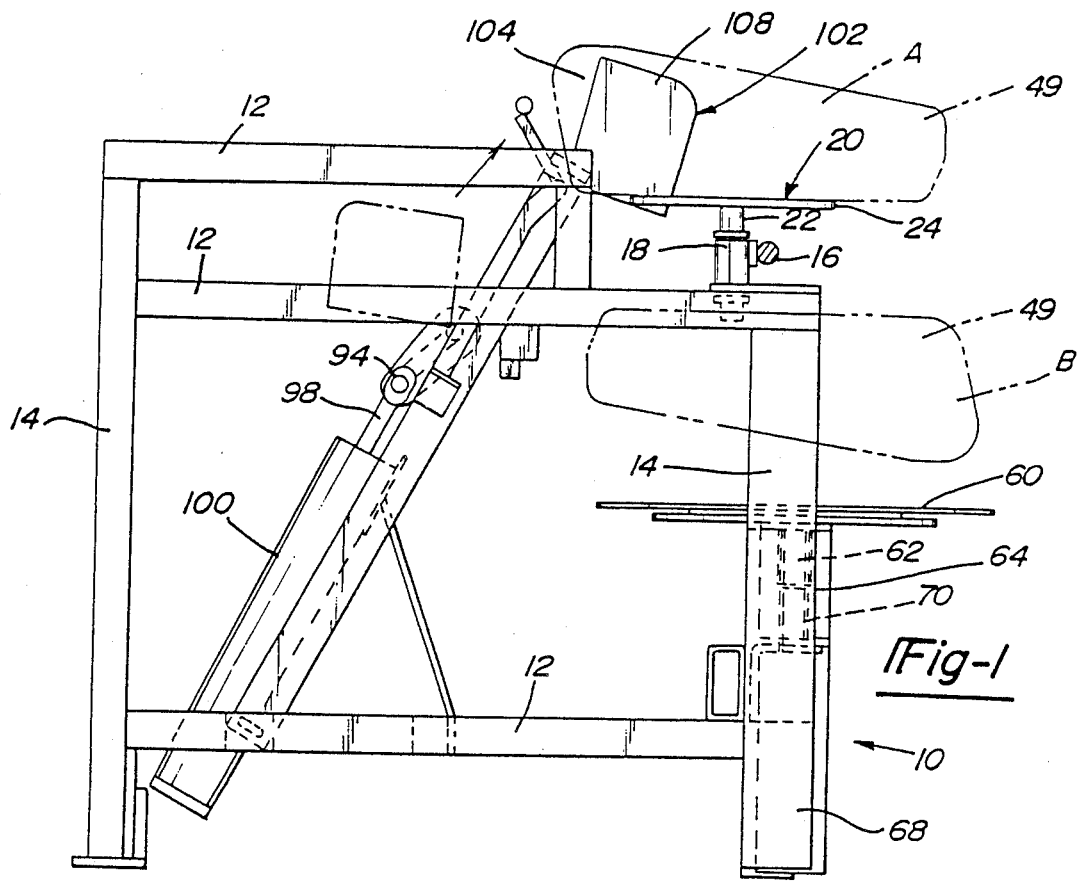
FIG. 1 is a side elevational view of a preferred form of the invention.
Figure 2:
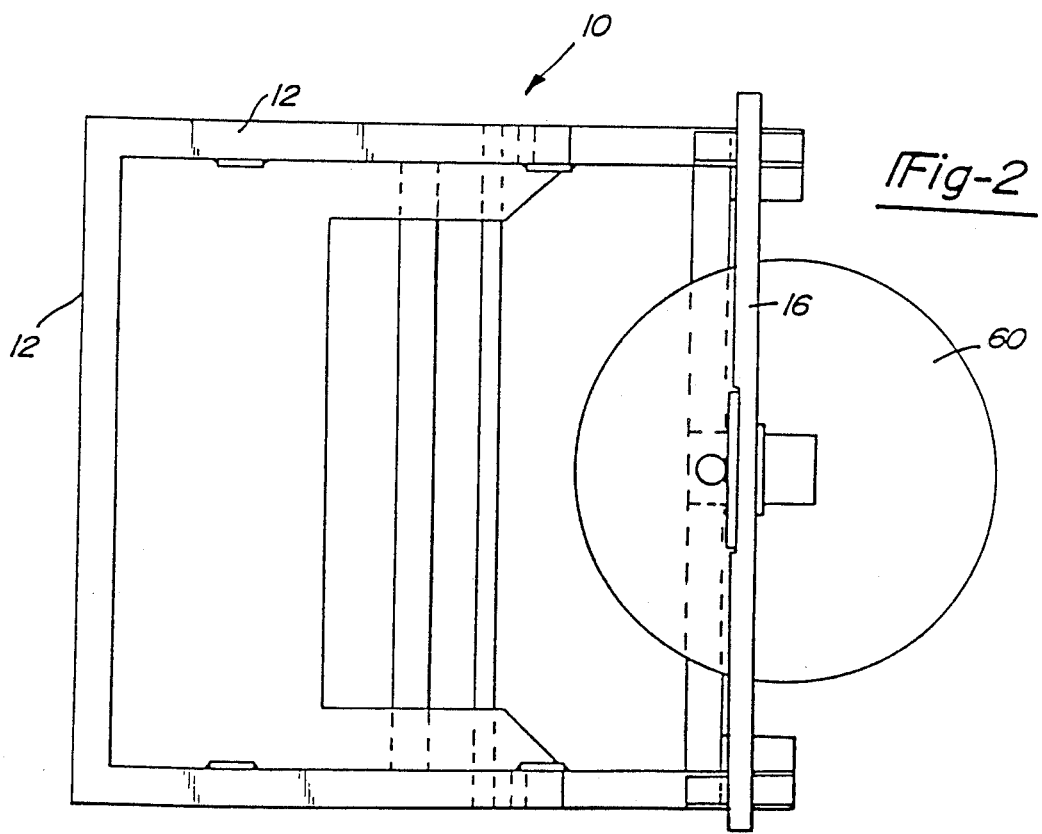
FIG. 2 is a fragmentary top plan view.
Figure 3:
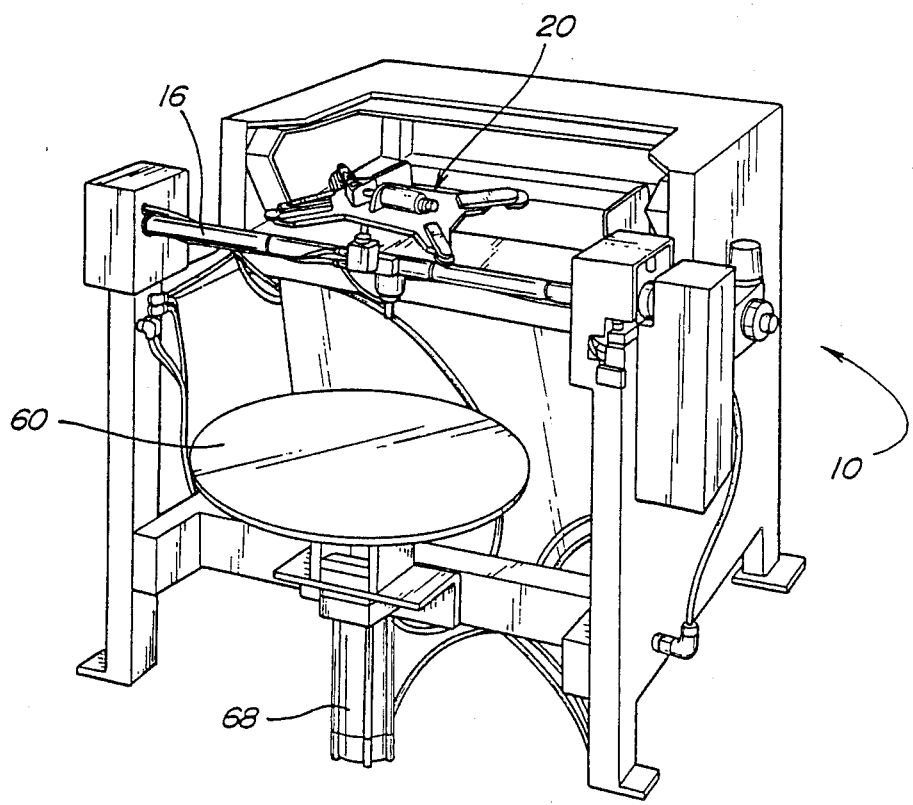
FIG. 3 is a front elevational view.

Once the frame 52 is latched to the seat frame support 20, the support 20 can be used to hold the cushion 49 in the upright position shown at A in FIG. 1 or to hold the cushion in a 180° opposite position with the frame 52 upward and the cushion 50 downward as indicated at B in FIG. 1.

Beneath the shaft 16 and the seat frame support 20, there is positioned a disc shaped pressure plate 60 (FIG. 1). Plate 60 has a depending stem 62 which is received in a sleeve 64. The sleeve 64 is secured to a plate 66 which is supported by the support 10. A hydraulic cylinder 68 is mounted vertically in the support 10 with its piston rod 70 bearing against the stem The cylinder 68 is controlled through switchable means (not shown) and can be operated to raise and lower the disc plate 60. As illustrated in FIG. 1, seat support 20 can be rotated, by rotating the shaft 16 from the up position A to the position B. It should be noted that the foam cushion 50 in the latter position lies directly above the plate 60. Piston rod 70 can then be raised to force the plate 60 against the cushion 50, and any cover (not shown) placed on the cushion 50, to compress the cushion upwardly against the seat frame 52 and the seat frame support 20 as will be hereinafter described.

Figure 5:
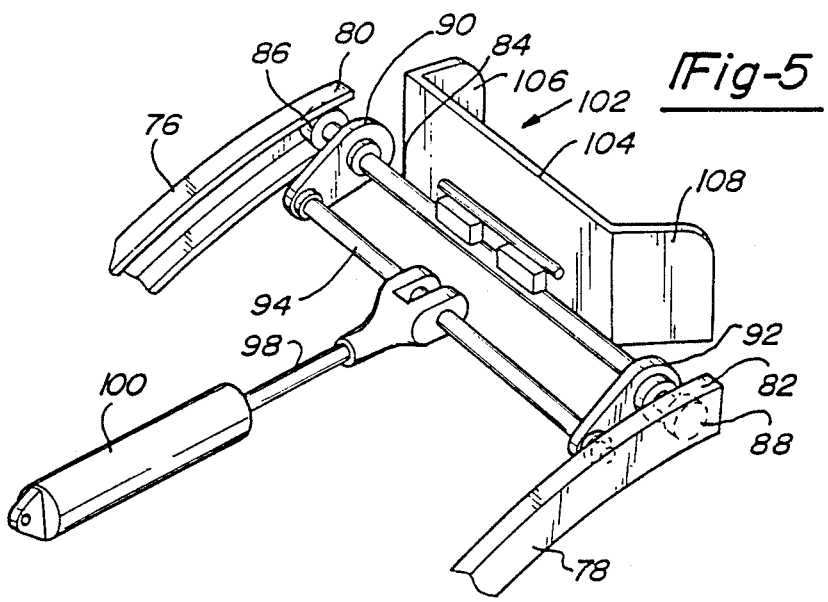
FIG. 5 is a perspective view of a pressure plate and its associated operator.

Referring now to FIGS. 1 and 5, rearwardly of the seat frame support 20, there is a pair of facing cam tracks 76 and 78 supported by frame members 12 of the support 10. The cam tracks 76, 78 slope upwardly, as viewed in FIG. 1, for a substantial portion of their length and have upper sections 80 and 82 (FIG. 5) curving inwardly toward the front of the support 10, and with respect to the seat frame support 20, i.e. to the right as viewed in FIG. 1.

As can beest be seen in FIG. 5 within the cam tracks 76 and 78, there is supported a shaft 84 having two cam followers 86 and 88 rotatably supported in the cam tracks 76, 78 at the opposite ends of the shaft 84 to guide the shaft 84 along the cam tracks 76, 78.

A pair of crank arms 90 and 92 are secured to the shaft 84. The crank arms 90 and 92 support a cross rod 94 to which is rotatably secured by clippers 96 a piston rod 98 of cylinder 100. Cylinder 100 is supported in support frame 10 (FIG. 1). The cylinder-piston combination serves to drive the cam followers 86, 88 attached to shaft 84 upwardly and downwardly in tracks 76 and 78. The canting of the upper ends of the tracks 76, 78 serves to force clockwise rotation of the shaft 84 as the piston rod 98 moves upwardly and in reverse rotation as it moves downwardly.

A cushion compression frame 102 comprising a back plate 104, FIG. 5, and outwardly extending side plates 106 and 108 is affixed to the shaft 84 in the form shown such that when the shaft 84 is in its uppermost position the back plate 104 will project upwardly and slightly to the right of the vertical, as shown in FIG. 1, with side plates 106 and 108 projecting forwardly toward the plate 20. It will be apparent that a cushion such as 48 of a size such as indicated in FIG. 1 and projecting to the sides of plate 20, with appropriate sizing of the relative parts, will have its frontal edge (the left edge in FIG. 1) and adjacent sides compressed by frame 102 when frame 102 is driven to its uppermost position. With appropriate sizing a cover such as 110 (FIG. 6) which is normally of a smaller size than the foam cushion over which it is to be placed can be pulled downwardly over the cushion, with ease as compared to attempting this over the uncompressed cushion when the forward edge of the cushion is compressed by the frame 102.

When the cover 110 is pressed over the cushion 49 the cover 110 also exends over the compression frame 102. However once the cover 110 is in place, the cylinder 100 can be actuated to retract frame 102 downwardly and rearwardly from the cover 110 for a substantial distance before the frame 102 swings rearwardly thus clearing the cover 110 and leaving the cover 110 in place on the foam which can now expand within the cover 110. It will be apparent that various dimensional relationships will suit different cushion shapes and sizes and fabric covers. The important thing is that by compressing the front forward portion of the cushion 49 sufficiently a cover 110 can be easily placed over the cushion 49 whereon thereafter the compressing device can be withdrawn with the cover 110 remaining in place. Now the cushion 49 may expand and fully press against the cover 110.

It would also be apparent that once this is accomplished and with the lower portion of the cover 110 extending downwardly as is common beneath the frame 52 of the cushion 48 the cushion 49 and the supporting plate 20 can be rotated from position A to position B as shown until the cushion 48 is now upside down as compared to its first position. Now the disc 60 can be urged upwardly to compress the whole cushion 49 and make it easy to pull the cover upwardly over the back of the seat frame 52 and inwardly over the springs 56 whereupon the cushion 49 can be hog-tied in the common fashion. Once this is accomplished the disc 60 can be withdrawn and the latch members 31, 36 on the frame seat support 20 withdrawn, whereupon the cushion 49 can be removed with the cover 110 fully in place.

From the above it will be seen that we have provided an apparatus whereby seat cushions can be covered with ease as compared to heretofor methods. According to the invention there is provided an apparatus whereby the cushion is held in position in an upright position for easy placement of a cover over the top of the cushion and means are provided for compressing a portion of the foam core of the cushion sufficiently so that a cover which is normally of a size less than the overall shape of the cushion in order to insure a taut relationship between the cushion and cover, can be readily placed over the cushion. Whereupon the compressing device is withdrawn and the cushion allowed to expand within the cover. According to the invention, the compressing device retains the cushion under compression until the cover is completely over the cushion and in fact the cushion extends over the compressing device, yet the compressing device can be readily withdrawn with the cushion cover in place. The cushion cover, as is known in the art, is of a size that when it is initially placed over the top of the cushion its lower edges extend below the frame of the cushion sufficiently so that they can be pulled inwardly over the frame and hog-tied to the spring section. According to the invention to facilitate the latter step, the cushion machine is constructed so that the cushion can be readily reversed and again compressed such that the cover can easily be then fully extended downwardly over the cushion and inwardly over the frame in proper position to be hog-tied or otherwise attached. It is apparent that the apparatus makes it possible to attach the cushion covers with a minimum amount of effort on the part of the workmen. It will considerably increase the productive capacity and greatly reduce the strain upon the workers.

Other advantages of the present invention will become apparent to one of only ordinary skill in the art. Various modifications and changes may be made in the above described apparatus without departing from the spirit of the invention as expressed by the scope of the appended claims.

I claim:

1. A seat cushion compressing machine comprising a support having means for rotatably supporting and retaining a seat member, said seat member having an upper resilient compressible cushion and a lower member defining a frame, in a first position with said cushion facing in a first direction, means for temporarily compressing at least a substantial portion of said cushion with respect to said frame and said support thereby reducing the overall size of said cushion to facilitate placing a cushion cover having a shape conforming to the contour of said cushion downwardly over said cushion and for maintaining said cushion in a compressed state while said cover is placed over said cushion, and for releasing compressive force upon the cushion after said cover is placed over said cushion, means for rotating said support and the cushion mounted thereon with said cover over said cushion into a second position in which said cushion is facing in a substantially opposite direction from said first direction, means for compressing said cushion and said cover in the latter position with respect to said support and said cushion frame and thereby forcing the open end of said cover upwardly with respect to said frame and said support and facilitating stretching of said open end of said cover inwardly over said frame for attachment of said cover to said frame.

2. The seat cushion compression machine of claim 1 wherein in said first position said cushion faces upwardly and in said second lower position said cushion faces downwardly.

3. The cushion compression machine of claim 1 wherein said support comprises releasable and extensible locking means for locking said cushion and said frame to said support.

4. The cushion compression machine of claim 1 wherein said support is pivotably mounted about a horizontal axes.

5. The cushion compression machine of claim 4 wherein said first means for compressing a portion of said cushion comprises a member adapted to be pressed against a portion of said cushion when said cushion is in said first position.

6. The cushion compressing machine of claim 1 wherein said first means for compressing said portion of said cushion comprises a member adapted to be pressed against a portion of said cushion when said cushion is in said first position.

7. The cushion compressing machine of claim 1 wherein said first means for compressing and retaining said cushion in compressed state comprises a pressure plate movable toward and inwardly of said support while said support is in said first position.

8. A cushion compressing machine of claim 7 wherein said pressure plate is movable from beneath said support upwardly toward and inwardly of said support.

9. The cushion compressing machine of claim 7 wherein said pressure plate is movable against one side of said support.

10. The cushion compressing machine of claim 1 including said means for compressing a portion of said cushion comprising a plate, and including means for advancing said plate against the cushion and retaining the said cushion in compressed state through contact with said cushion until said cover is placed over said cushion and thereafter withdrawing said plate from said cushion when said cover is in place upon said cushion.

11. A cushion compressing machine comprising a frame, a seat cushion support, means for fixing and releasing a cushion on said support, said support being mounted for rotation from a first position in which a cover is applied to said cushion to a second position in which said cover is affixed to a frame of said cushion, means for compressing and compacting said cushion in said first position to facilitate placing said cover over said cushion, means for releasing said cushion from said means for compressing said cushion when said cover is placed over said cushion, means for thereafter applying force through said cover and against the face of said cushion to compress said cushion and facilitate attachment of said cover to a cushion seat frame attached to said cushion.

12. The cushion compressing machine of claim 11 including means for rotating said support and cushion to a second position and said means for applying force to said cover and said cushion face being operative when said cushion is in said second position.

13. The cushion compressing machine of claim 11 wherein in said first position said cushion faces upwardly with said frame facing downwardly and in said second position the relative positions of said cushion and said frame are reversed.

* * * * *